(12) United States Patent
Jones (10) Patent No.: US 9,821,790 B2
(45) Date of Patent: Nov. 21, 2017

(54) SYSTEM AND METHOD TO FACILITATE SATISFYING LOW EMISSION ZONE REQUIREMENTS

(71) Applicant: JAGUAR LAND ROVER LIMITED, Warwickshire (GB)

(72) Inventor: Matt Jones, Portland, OR (US)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 63 days.

(21) Appl. No.: 14/972,457

(22) Filed: Dec. 17, 2015

(65) Prior Publication Data

US 2017/0174204 A1 Jun. 22, 2017

(51) Int. Cl.

| | |
|---|---|
| B60W 20/00 | (2016.01) |
| B60W 20/12 | (2016.01) |
| B60W 10/08 | (2006.01) |
| B60W 10/26 | (2006.01) |
| B60W 10/30 | (2006.01) |
| G01C 21/34 | (2006.01) |
| G01C 21/36 | (2006.01) |
| G07C 5/00 | (2006.01) |
| B60W 50/00 | (2006.01) |
| B60W 50/14 | (2012.01) |
| B60W 10/06 | (2006.01) |

(Continued)

(52) U.S. Cl.
CPC ............ *B60W 20/12* (2016.01); *B60W 10/06* (2013.01); *B60W 10/08* (2013.01); *B60W 10/26* (2013.01); *B60W 10/30* (2013.01); *B60W 20/00* (2013.01); *B60W 20/13* (2016.01); *B60W 20/16* (2016.01); *B60W 20/20* (2013.01); *B60W 50/0097* (2013.01); *B60W 50/14* (2013.01); *G01C 21/3469* (2013.01); *G01C 21/3691* (2013.01); *G07C 5/004* (2013.01); *B60W 2510/08* (2013.01); *B60W 2510/244* (2013.01); *B60W 2550/12* (2013.01); *B60W 2550/141* (2013.01); *B60W 2550/142* (2013.01); *B60W 2550/20* (2013.01); *B60W 2550/22* (2013.01); *B60W 2550/402* (2013.01); *B60W 2710/08* (2013.01); *B60W 2710/30* (2013.01)

(58) Field of Classification Search
None
See application file for complete search history.

(56) References Cited

U.S. PATENT DOCUMENTS

| | | | | |
|---|---|---|---|---|
| 8,428,803 | B2 * | 4/2013 | Komatsu | ............... B60K 6/365 701/22 |
| 2003/0078707 | A1 * | 4/2003 | Shioda | .................... B60K 6/48 701/22 |

(Continued)

*Primary Examiner* — Adam Tissot
*Assistant Examiner* — Garrett Evans
(74) *Attorney, Agent, or Firm* — Carlson, Gaskey & Olds (57) ABSTRACT

According to an aspect of the invention, there is provided a method of managing vehicle electrical power that includes determining that there is at least one low emission zone along a route, determining a required power capacity a vehicle electric power source needs to propel the vehicle through the at least one low emission zone, determining a remaining power capacity of the vehicle electric power source and controlling use of electrical power on the vehicle to preserve at least a portion of the remaining power capacity corresponding to the required power capacity for use in propelling the vehicle through the at least one low emission zone.

22 Claims, 3 Drawing Sheets

(51) Int. Cl.
  *B60W 20/20*     (2016.01)
  *B60W 20/13*     (2016.01)
  *B60W 20/16*     (2016.01)

(56) References Cited

U.S. PATENT DOCUMENTS

2005/0262853 A1* 12/2005 Salim ................... B60H 1/005
                                                    62/59
2012/0290149 A1* 11/2012 Kristinsson ........... B60W 10/06
                                                    701/2
2015/0345962 A1* 12/2015 Graham ............... G01C 21/343
                                                    701/430

* cited by examiner

FIG. 4 ional impact of automotive vehicles. One example approach has been to

SYSTEM AND METHOD TO FACILITATE SATISFYING LOW EMISSION ZONE REQUIREMENTS

TECHNICAL FIELD

The present disclosure relates to facilitating driving a vehicle in a low emission zone. Aspects of the invention relate to a system, a vehicle and a method.

BACKGROUND

There are a variety of ways in which governmental agencies have attempted to limit the environmental impact of automotive vehicles. One example approach has been to impose fuel efficiency ratings to promote less natural resource consumption. Another example approach has been to impose limitations on vehicle exhaust emissions. For example, the content of exhaust emissions has been regulated for various vehicle types. Additionally, some areas include specified zones in which emissions should meet a low threshold. The low emission zone in London, England is one example that is intended to limit diesel engine contributions to air pollution.

With the increasing availability of electric propulsion systems on electric or hybrid vehicles, it becomes possible to satisfy low emission standards by relying on electrical power to propel the vehicle through a low emission zone.

Embodiments of this invention provide enhancements to vehicle operation to more reliably ensure that a driver can satisfy low emission zone requirements.

SUMMARY

Aspects and embodiments of the invention provide a system, a method and a vehicle as claimed in the appended claims.

According to an aspect of the invention, there is provided a method of managing vehicle electrical power that includes determining that there is at least one low emission zone along a route, determining a required power capacity a vehicle electric power source needs to propel the vehicle through the at least one low emission zone, determining a remaining power capacity of the vehicle electric power source and controlling use of electrical power on the vehicle to preserve at least a portion of the remaining power capacity corresponding to the required power capacity for use in propelling the vehicle through the at least one low emission zone.

In an example embodiment having one or more features of the method of the previous paragraph, controlling the use of electrical power on the vehicle comprises automatically using an alternative source of power to propel the vehicle along a portion of the route outside the low emission zone to preserve at least the portion of the remaining power for use in the low emission zone.

In an example embodiment having one or more features of the method of either of the previous paragraphs, controlling the use of electrical power on the vehicle comprises providing an indication to a driver to select an alternative source of power to propel the vehicle along a portion of the route outside the low emission zone to preserve at least the portion of the remaining power for use in the low emission zone.

In an example embodiment having one or more features of the method of any of the previous paragraphs, controlling the use of electrical power on the vehicle comprises identifying at least one vehicle system that uses electrical power and automatically adjusting operation of the at least one vehicle system to reduce an amount of electrical power used by the at least one vehicle system.

In an example embodiment having one or more features of the method of any of the previous paragraphs, determining that there is at least one low emission zone along the route comprises determining locations along the route based on navigation information for automatically guiding a driver along the route and determining whether any of the locations along the route corresponds to a location of a known low emission zone.

In an example embodiment having one or more features of the method of any of the previous paragraphs, determining that there is at least one low emission zone along the route comprises recognizing at least one feature of a current trip as an indication that the vehicle is on a route that was previously determined to include a low emission zone.

In an example embodiment having one or more features of the method of any of the previous paragraphs, determining that there is at least one low emission zone along the route comprises: tracking a plurality of travels of the vehicle, determining whether any of the plurality of travels include a similar path that corresponds to an identifiable route, storing information regarding any identified route including information regarding locations along the identified route, identifying a location along any identified route where driver action corresponded to operating the vehicle in a manner that satisfies a low emission zone operation requirement during the plurality of previous travels along the identified route, storing the identified location as a location of a low emission zone associated with the identified route, automatically recognizing the route based on current vehicle movement along at least a portion of a previously identified route and determining whether there is any stored identified location of a low emission zone associated with the route.

An embodiment having one or more features of the method of any of the previous paragraphs includes determining the required power capacity based on at least one characteristic of the route through the at least one low emission zone, the at least one characteristic having an impact on electrical energy use.

In an example embodiment having one or more features of the method of any of the previous paragraphs, the at least one characteristic comprises at least one of a distance through the low emission zone, a change in elevation in the low emission zone, a traffic condition in the low emission zone, and a weather condition in the low emission zone.

An embodiment having one or more features of the method of any of the previous paragraphs includes determining that the remaining power capacity is less than the required power capacity, providing an indication corresponding to an alert that there is insufficient power capacity to travel through the low emission zone, providing an indication of at least one location where additional power capacity is available prior to reaching the low emission zone and providing automated route guidance to the at least one location based on a user selection of the at least one location.

According to another aspect of the invention, there is provided a vehicle comprising a system configured to perform the method of any of the previous paragraphs.

According to another aspect of the invention, there is provided a system that includes user interface means for providing information to an individual in a vehicle and control means for determining that there is at least one low emission zone along a route, determining a required power capacity a vehicle electric power source needs to propel the vehicle through the at least one low emission zone, determining a remaining power capacity of the vehicle electric power source, and controlling use of electrical power on the vehicle to preserve at least a portion of the remaining power capacity corresponding to the required power capacity for use in propelling the vehicle through the at least one low emission zone.

In an example embodiment having one or more features of the system of the previous paragraph, the user interface means includes at least one of a display screen and a speaker and the control means includes at least one computing device and memory associated with the at least one computing device.

In an example embodiment having one or more features of the system of any of the previous paragraphs, at least one computing device comprises a first processor configured to determine information regarding the route and the at least one low emission zone and a second processor configured to determine the required power capacity.

In an example embodiment having one or more features of the system of any of the previous paragraphs, the control means is configured for controlling the use of electrical power on the vehicle by automatically selecting an alternative source of power to propel the vehicle along a portion of the route outside the low emission zone to preserve at least the portion of the remaining power for use in the low emission zone.

In an example embodiment having one or more features of the system of any of the previous paragraphs, the control means is configured for controlling the use of electrical power on the vehicle by controlling the user interface means for providing an indication to a driver to select an alternative source of power to propel the vehicle along a portion of the route outside the low emission zone to preserve at least the portion of the remaining power for use in the low emission zone.

In an example embodiment having one or more features of the system of any of the previous paragraphs, the control means is configured for determining that there is at least one low emission zone along the route by determining locations along the route based on navigation information for automatically guiding a driver along the route and determining whether any of the locations along the route corresponds to a location of a known low emission zone.

In an example embodiment having one or more features of the system of any of the previous paragraphs, the control means is configured for determining that there is at least one low emission zone along the route by recognizing at least one feature of a current trip as an indication that the vehicle is on a route that was previously determined to include a low emission zone.

In an example embodiment having one or more features of the system of any of the previous paragraphs, the control means is configured for determining that there is at least one low emission zone along the route by tracking a plurality of travels of the vehicle, determining whether any of the plurality of travels include a similar path that corresponds to an identifiable route, storing information regarding any identified route including information regarding locations along the identified route, identifying a location along any identified route where driver action corresponded to operating the vehicle in a manner that satisfies a low emission zone operation requirement during the plurality of previous travels along the identified route, storing the identified location as a location of a low emission zone associated with the identified route, automatically recognizing the route based on current vehicle movement along at least a portion of a previously identified route and determining whether there is any stored identified location of a low emission zone associated with the route.

In an example embodiment having one or more features of the system of any of the previous paragraphs, the control means is configured for determining the required power capacity based on at least one characteristic of the route through the at least one low emission zone, the at least one characteristic having an impact on electrical energy use.

In an example embodiment having one or more features of the system of any of the previous paragraphs, the at least one characteristic comprises at least one of a distance through the low emission zone, a change in elevation in the low emission zone, a traffic condition in the low emission zone, and a weather condition in the low emission zone.

In an example embodiment having one or more features of the system of any of the previous paragraphs, the control means is configured for determining that the remaining power capacity is less than the required power capacity and controlling the user interface means to provide an indication corresponding to an alert that there is insufficient power capacity to travel through the low emission zone, provide an indication of at least one location where additional power capacity is available prior to reaching the low emission zone and provide automated route guidance to the at least one location based on a user selection of the at least one location.

In an example embodiment having one or more features of the system of any of the previous paragraphs, the control means is configured for identifying at least one vehicle system that uses electrical power and automatically adjusting operation of the at least one vehicle system to reduce an amount of electrical power used by the at least one vehicle system.

According to another aspect of the invention, there is provided a vehicle comprising the system of any of the previous paragraphs.

According to another aspect of the invention, there is provided a system including a user interface having at least one of a display for providing visual information or a speaker for providing audible information to an individual. The system includes a controller that is configured to determine that there is at least one low emission zone along a route. The controller is also configured to determine a required power capacity a vehicle electric power source needs to propel the vehicle through the at least one low emission zone. The controller is also configured to determine a remaining power capacity of the vehicle electrical power source and control use of electrical power on the vehicle to preserve at least a portion of the remaining power capacity corresponding to the required power capacity for use in propelling the vehicle through the at least one low emission zone.

Within the scope of this document it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of this invention provide control over electrical power consumption on a vehicle to facilitate satisfying low emission zone requirements.

Figure 1:
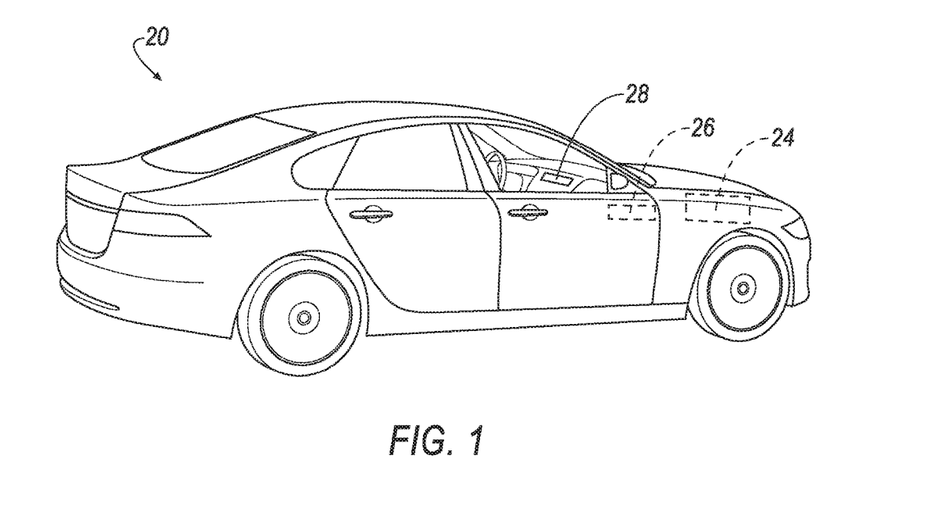
FIG. 1 diagrammatically illustrates an example embodiment of a system designed according to an embodiment of this invention associated with a vehicle.
Figure 2:
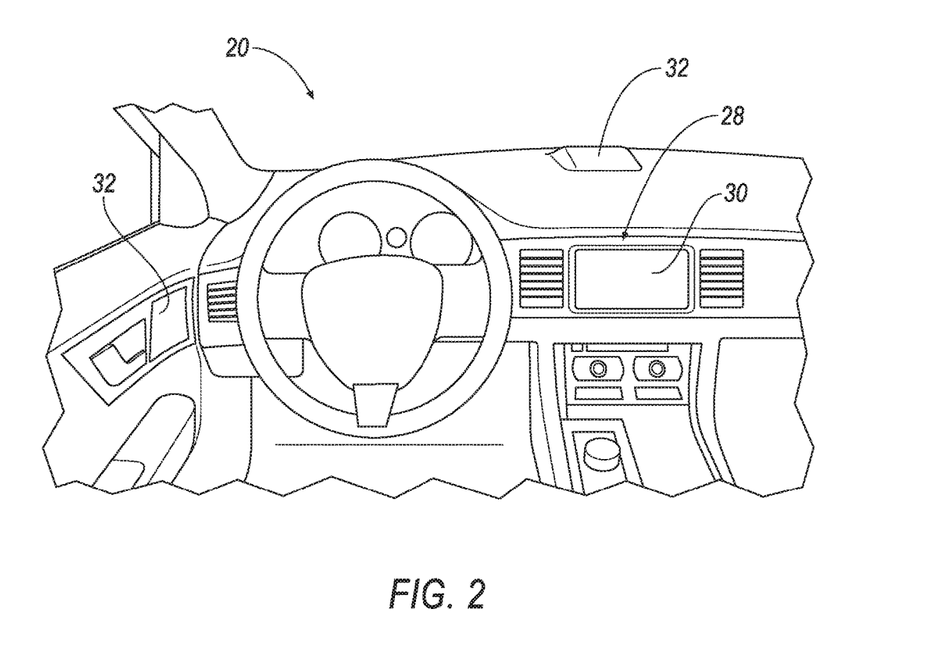
FIG. 2 diagrammatically illustrates selected portions of the example system situated in the interior of the example vehicle.
Figure 3:
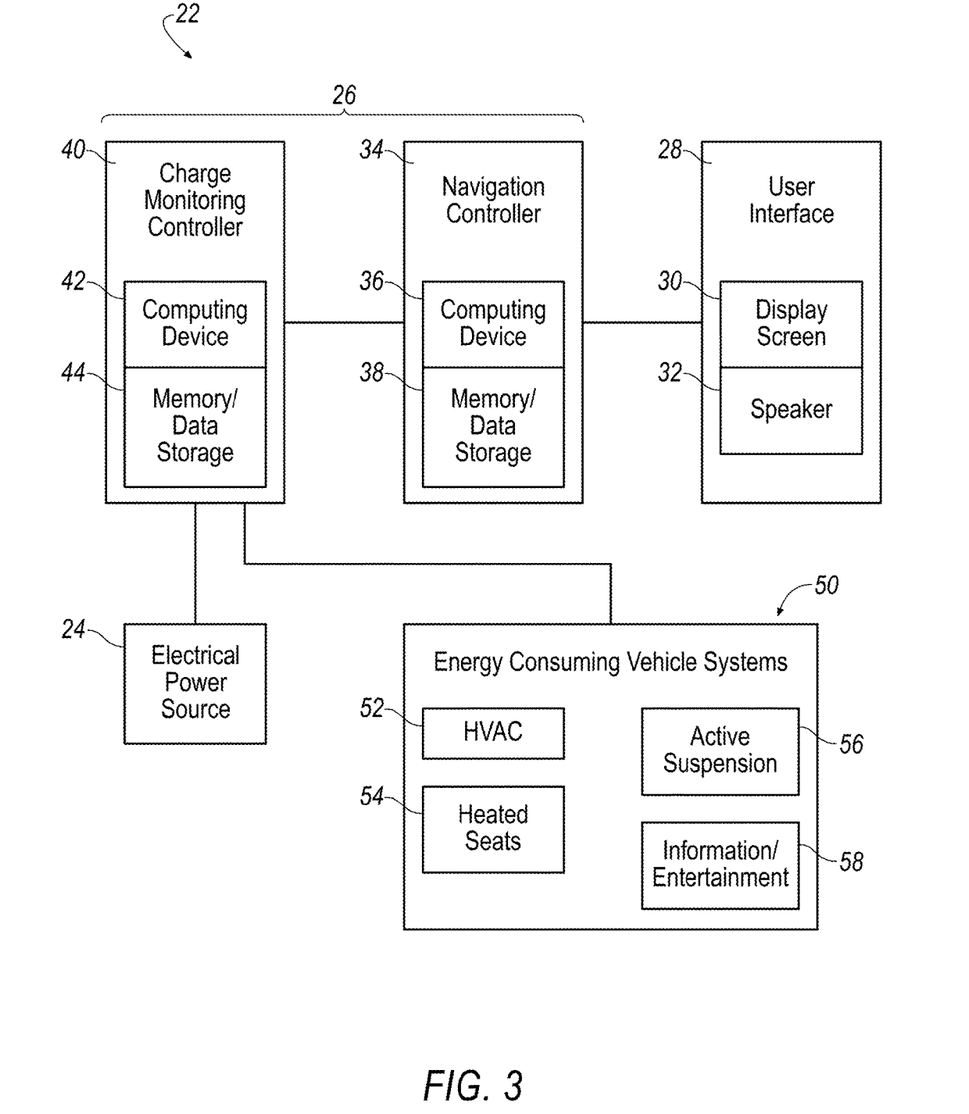
FIG. 3 schematically illustrates selected portions of a system designed according to an embodiment of this invention.

FIGS. 1-3 illustrate a vehicle 20 having an associated system 22 that facilitates driving the vehicle 20 in a manner that reserves power capacity of a source 24 of electrical power for the vehicle 20 for use in a low emission zone. The system 22 includes a control means 26 and a user interface means 28. In the illustrated example, the user interface means 28 includes a display screen 30 that provides visible information to an individual within the vehicle 20. The user interface means 28 in this example also includes at least one speaker 32 that provides audible information to an individual in the vehicle 20. The user interface means 28 is also capable of receiving information from an individual within the vehicle based on at least one input device, such as a microphone (not illustrated), a touch pad or control switch (not illustrated) or use of the display screen 30 when the embodiment includes a touch screen.

The control means 26 in this example includes at least one computing device or processor and associated data storage or memory. It is to be understood that the computing device can comprise a control unit or computational device having one or more electronic processors (e.g., a microprocessor, a microcontroller, an application specific integrated circuit (ASIC), etc.), and may comprise a single control unit or computational device, or alternatively different functions of the computing device may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the computing device to implement the control techniques described herein (including some or all of the functionality required for the method described herein). The set of instructions could be embedded in said one or more electronic processors of the computing device; or alternatively, the set of instructions could be provided as software to be executed in the computing device. A first controller or control unit may be implemented in software run on one or more processors. One or more other controllers or control units may be implemented in software run on one or more processors, optionally the same one or more processors as the first controller or control unit. Other arrangements are also useful.

As shown in FIG. 3, the illustrated example includes a navigation controller 34 comprising a processor or computing device 36 and associated memory 38. The navigation controller 34 is programmed or otherwise configured to use known techniques for providing route guidance or navigation information to a driver of the vehicle 20. The navigation controller 34 is configured or programmed to be able to identify locations of low emission zones where vehicle exhaust restrictions are imposed. Such locations may be known from available global positioning system or navigation database information or available through an Internet-based source of information, for example. The navigation controller 34 may obtain such information in a known manner.

In some example embodiments, the navigation controller 34 has the capability of learning locations of low emission zones. The navigation controller 34 in such examples tracks a plurality of travels of the vehicle to determine whether any of the plurality of travels include a similar path that corresponds to an identifiable route. The controller 34 stores information in the memory 36 regarding any identified route including information regarding locations along the identified route. If driver action corresponded to operating the vehicle in a manner that satisfies a low emission zone operation requirement in the same location during the plurality of previous travels along an identified route, that location may be identified as a location of a low emission zone associated with that route. The navigation controller 34 may subsequently recognize when the vehicle is travelling along that route and determining whether there is any stored identified location of a low emission zone associated with that route.

The control means 26 in this example also includes a power monitor controller 40 that includes a computing device 42 and memory 44. The power monitor controller 40 is programmed or otherwise configured to make determinations regarding at least a current power capacity of the electrical power source 24, an amount of electrical power necessary for propelling the vehicle in any low emission zone along a planned or current route, and to utilize information from the navigation controller 34 for making such determinations.

Some embodiments will include discrete components for the navigation controller 34 and the power monitor controller 40, respectively, as schematically shown in FIG. 3. Other embodiments will include a single device as the controller that is configured to perform the different functions described as being performed by one of the respective controllers within this description. In a similar manner, some embodiments will have discrete devices used for the memory 38 and 44, respectively, while other embodiments will utilize a single memory. Some example embodiments include the memory 38 and 44 at a remote location that is accessible by the control means 26 using known data communication techniques for uploading information to such a memory or downloading information from it. Given this description, those skilled in the art will realize what devices, hardware, software, firmware or combination of these will best meet the needs of their particular situation.

The power monitor controller 40 is configured to dynamically update information regarding a remaining power capacity or a remaining amount of power available from the electrical power source 24. Power capacity may be measured or quantified in different ways depending on the particular power source. For example, a battery capacity may be expressed in terms of charge while a fuel cell capacity may be expressed in terms of available reactants or fuel. For purposes of discussion in the remainder of this description, the electrical power source 24 is assumed to be a rechargeable device, such as a battery, but embodiments of this invention are not necessarily limited to any particular power source configuration. A variety of electrical power sources may be utilized to provide power necessary for propelling the vehicle 20.

As shown in FIG. 3, the power monitor controller 40 also utilizes information regarding a plurality of energy consuming vehicle systems schematically shown at 50. For discussion purposes and by way of example, energy consuming vehicle systems such as the heating, ventilation and air conditioning system (HVAC) 52, heated seats 54, active suspension 56, and information or entertainment system 58, utilize electrical power that may come from the electrical power source 24.

Figure 4:
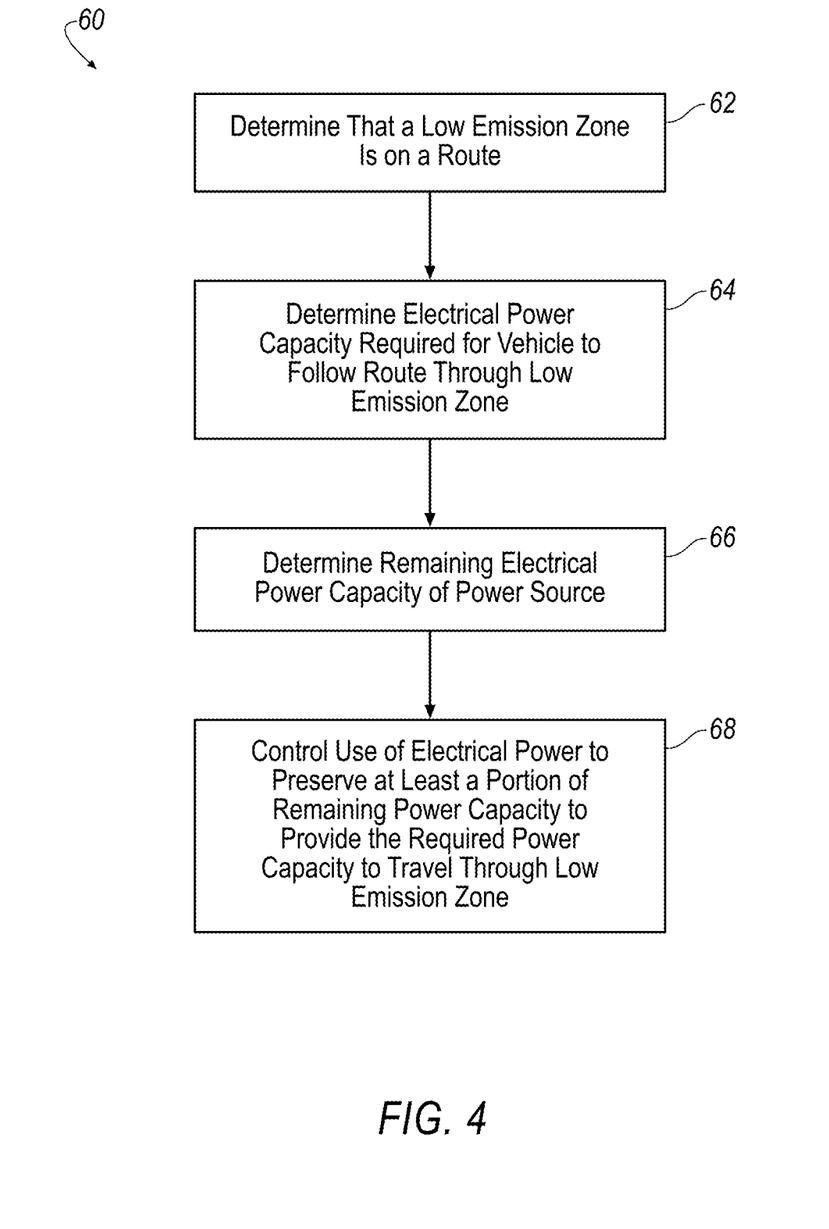
FIG. 4 is a flow chart diagram that summarizes an example method of controlling use of electrical power for facilitating driving a vehicle to satisfy low emission requirements.

The control means 26 facilitates driving the vehicle 20 in a manner that accommodates low emission requirements based upon information regarding the remaining power capacity of the electrical power source 24 and information regarding at least one low emission zone along a current or planned route of a current vehicle journey. FIG. 4 includes a flow chart diagram 60 that summarizes an example approach.

At 62 the control means 26 determines that there is at least one low emission zone along a route. The navigation controller 34 has information regarding the route currently being followed by the vehicle 20. This information may be obtained in a variety of ways. For example, the driver of the vehicle 20 may have entered a selected destination and the navigation controller 34 is providing route guidance to the driver along a planned route. Alternatively, the navigation controller 34 may be aware of a current location of the vehicle, which can be determined in a known manner using global positioning system devices and techniques. Given the known location of the vehicle and a current trajectory, the control means 26 can determine that the vehicle is approaching a known low emission zone.

One example way of determining that there is at least one low emission zone along the route includes recognizing at least one feature of a current trip as an indication that the vehicle is on a route that was previously determined to include a low emission zone. In some embodiments, the control means 26 is programmed or otherwise configured to estimate a route of a current vehicle journey based upon previous travels of the vehicle 20. For example, a vehicle owner typically follows a common route on the way to a place of business or employment several days a week. The control means 26 in such an embodiment utilizes information from a global positioning system to track or record such route information and associate that with a time of day, for example. During a subsequent journey, if the current location of the vehicle, trajectory and time of day correspond to a previously learned and stored route, the control means 26 may identify such a route as the current route of the vehicle 20.

Regardless of how the control means 26 determines the current route, once a location of a known low emission zone is determined to be along that route, the control means 26 determines a required power capacity of the electric power source 24 that is needed to propel the vehicle 20 through the low emission zone at 64. The determination regarding the required power capacity takes information into account regarding the actual route that the vehicle 20 will follow through the low emission zone. At least one characteristic associated with the vehicle 20 traveling through the low emission zone is taken into account for purposes of determining the required power capacity. There are a variety of characteristics that have an effect on electrical power use and at least one of them is utilized by the control means 26 for the determination at 64.

Example characteristics that affect how a remaining charge level of the electric power source 24 will be consumed as the vehicle moves through the low emission zone include characteristics that affect propulsion or other ways in which systems on the vehicle consume electrical power. For example, if the portion of the route that includes the low emission zone involves various or significant elevation or grade changes that affects how much acceleration is required and how much regenerative braking may be available. Elevation or grade information is known within many navigation databases or from the Internet and can be obtained by the control means 26 in a known manner. Traffic conditions are another example characteristic that may have an effect on energy use in the low emission zone. The total distance along the planned or current route through the low emission zone also may have an effect on the required charge level. Weather conditions are another characteristic that may affect energy usage along the planned route in low emission zone. For example, the ambient temperature impacts how much the driver will utilize the HVAC system 52. Additionally, information regarding the current operating conditions of the energy consuming vehicle systems 50 has an effect on the required charge level. According to the illustrated embodiment, at least one such characteristic is taken into account when determining the required charge level at 64.

As mentioned above, in some embodiments the control means 26 monitors energy usage while the vehicle 20 is driven through a known low emission zone on previous journeys and stores such information in the memory 38 or 44, whether on board the vehicle or uploaded to a remote location. When such information is stored at a remote location it is possible for a service provider or fleet manager, for example, to gather such information from a variety of vehicles and to provide aggregated or averaged energy use information regarding various low emission zones to a variety of vehicles having a system 22. In some embodiments the control means 26 accesses previous energy use information for at least one known low emission zone and uses that information to determine the expected energy use during the current trip through that low emission zone.

At 66, the control means 26 determines a remaining power capacity of the electric power source 24. At 68, the control means 26 controls use of electrical power on the vehicle 20 to preserve at least a portion of the remaining power capacity corresponding to the required power capacity for use in propelling the vehicle 20 through the low emission zone.

One way in which the control means 26 controls the use of electrical power to preserve enough for propelling the vehicle through the low emission zone is to automatically use an alternative source of power to propel the vehicle along a portion of the route outside the low emission zone. In a hybrid vehicle embodiment, for example, an internal combustion engine may be relied upon as the primary source of vehicle propulsion outside of the low emission zone when the remaining power capacity of the electrical power source 24 is within a predetermined range of the required power capacity. Under such circumstances, the control means 26 may limit use of the electrical power source 24 for vehicle propulsion except for within or near a low emission zone.

The control means 26 in some embodiments utilizes regenerative braking for providing additional power capacity to the source 24 regardless of the source of power in use for propelling the vehicle 20 at various times during the journey.

Another way in which the control means 26 may control the use of electrical power on the vehicle to preserve enough power capacity for use in the low emission zone is to automatically adjust operation of at least one of the vehicle systems 50 to reduce the amount of electrical power used by such a system. For example, under conditions in which the remaining power capacity is not much above the required power capacity, the power monitor controller 40 obtains information regarding the energy consuming vehicle systems 50 and determines which of those may be turned off or turned down in some manner to conserve electrical power. For example, the heated seats 54 may be turned off or a feature of the information or entertainment system 58 may be altered to reduce energy consumption (e.g., a display screen may be dimmed or turned off). Depending on a determination regarding outdoor temperature and the temperature of the interior of the vehicle 20, the HVAC system 52 may be controlled automatically to reduce an amount of energy consumption by that system.

One feature of the example control means 26 is that it allows for a driver or another individual in the vehicle to override any automatic adjustment or control over the energy consuming vehicle systems 50. The control means 26 in such an embodiment monitors such actions by a driver (or another individual) for purposes of learning a driver's preferences regarding which of the systems 50 may be automatically adjusted or an order in which those systems should be prioritized for adjustment when energy savings are desired. For example, a vehicle owner may not mind an information or entertainment display screen being turned off but may have a strong preference for a particular vehicle temperature. Under those conditions, the control means 26 will learn over time that adjusting the operation of such a display screen is preferred by the vehicle owner over making an adjustment to the HVAC system 52. Utilizing such information and controlling the systems 50 accordingly increases the satisfaction and reduces inconvenience to the vehicle owner while still obtaining energy savings when the available charge from the power source 24 is at a level that makes it at least somewhat questionable whether an intended destination is reachable.

Some example embodiments will provide an indication through the user interface means 28 regarding the automated control over the energy consuming systems 50 to alleviate any suspicion that the affected system is potentially malfunctioning. Additionally, some systems 22 will provide an indication to the driver that an override of the automated control is possible with a warning that such an override may result in insufficient power for satisfying the low emission zone requirements.

In the illustrated embodiment the control means 26 recognizes when the driver overrides any automated adjustment to the power consuming systems 50 and causes the user interface means 28 to provide an indication to the driver of the potential consequences of the override.

The control means 26 in some embodiments automatically controls the vehicle propulsion system to rely upon electrical power when traveling through a known low emission zone. In some embodiments, the control means 26 provides an indication on the display screen 30 that electrical power is being used through the low emission zone. In some embodiments, the control means 26 provides the driver an option to select whether electrical power will be used for propelling the vehicle through a low emission zone.

In some instances, the control means 26 determines that the remaining power capacity is less than the power capacity required for propelling the vehicle through a low emission zone. Under such circumstances, the control means 26 in some embodiments provides an alert or warning to the driver through the user interface 28. The control means 26 in some embodiments determines an alternate route or a deviation from a current route if necessary to reach a location of a charging station where additional power is available for the power source 24. In some circumstances, there may be known charging stations along the planned route and those will be indicated to the driver to give the driver an opportunity to obtain more power capacity so that the low emission requirements can be met.

Some embodiments include offering an alternative route that minimizes time in a low emission zone or avoids it all together when the control means 26 determines that there is insufficient electrical power capacity to satisfy the low emission zone requirements.

The disclosed embodiments utilize information available from the navigation controller 34 and information regarding a power capacity of the electrical power source 24 to facilitate relying upon electrical power to propel a vehicle through a low emission zone.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

I claim:

1. A method of managing vehicle electric power, the method comprising:
   automatically determining that there is at least one low emission zone along a route;
   automatically determining a required power capacity a vehicle electric power source needs to propel the vehicle through the at least one low emission zone;
   automatically determining a remaining power capacity of the vehicle electric power source; and
   controlling use of electrical power on the vehicle to preserve at least a portion of the remaining power capacity corresponding to the required power capacity for use in propelling the vehicle through the at least one low emission zone;
   wherein determining that there is at least one low emission zone along the route comprises:
   tracking a plurality of travels of the vehicle;
   determining whether any of the plurality of travels include a similar path that corresponds to an identifiable route;
   storing information regarding any identified route including information regarding locations along the identified route;
   identifying a location along any identified route where driver action corresponded to operating the vehicle in a manner that satisfies a low emission zone operation requirement during the plurality of previous travels along the identified route;
   storing the identified location as a location of a low emission zone associated with the identified route;
   automatically recognizing the route based on current vehicle movement along at least a portion of a previously identified route; and determining whether there is any stored identified location of a low emission zone associated with the route.

2. The method of claim 1, wherein controlling the use of electrical power on the vehicle comprises
automatically using an alternative source of power to propel the vehicle along a portion of the route outside the low emission zone to preserve at least the portion of the remaining power for use in the low emission zone.

3. The method of claim 1, wherein controlling the use of electrical power on the vehicle comprises
automatically providing an indication to a driver to select an alternative source of power to propel the vehicle along a portion of the route outside the low emission zone to preserve at least the portion of the remaining power for use in the low emission zone.

4. The method of claim 1, wherein controlling the use of electrical power on the vehicle comprises
identifying at least one vehicle system that uses electrical power; and
automatically adjusting operation of the at least one vehicle system to reduce an amount of electrical power used by the at least one vehicle system.

5. The method of claim 1, wherein determining that there is at least one low emission zone along the route comprises
determining locations along the route based on navigation information for automatically guiding a driver along the route; and
determining whether any of the locations along the route corresponds to a location of a known low emission zone.

6. The method of claim 1, wherein determining that there is at least one low emission zone along the route comprises recognizing at least one feature of a current trip as an indication that the vehicle is on a route that was previously determined to include a low emission zone.

7. The method of claim 1, comprising determining the required power capacity based on at least one characteristic of the route through the at least one low emission zone, the at least one characteristic having an impact on electrical energy use.

8. The method of claim 7, wherein the at least one characteristic comprises at least one of
a distance through the low emission zone,
a change in elevation in the low emission zone,
a traffic condition in the low emission zone, and
a weather condition in the low emission zone.

9. The method of claim 1, comprising
determining that the remaining power capacity is less than the required power capacity;
providing an indication corresponding to an alert that there is insufficient power capacity to travel through the low emission zone;
providing an indication of at least one location where additional power capacity is available prior to reaching the low emission zone; and
providing automated route guidance to the at least one location based on a user selection of the at least one location.

10. A vehicle comprising a system configured to perform the method of claim 1.

11. A system, comprising:
user interface means for providing information to an individual in a vehicle; and
control means for
determining that there is at least one low emission zone along a route;
determining a required power capacity a vehicle electric power source needs to propel the vehicle through the at least one low emission zone;
determining a remaining power capacity of the vehicle electric power source; and
controlling use of electrical power on the vehicle to preserve at least a portion of the remaining power capacity corresponding to the required power capacity for use in propelling the vehicle through the at least one low emission zone;
wherein the control means is configured for determining that there is at least one low emission zone along the route by:
tracking a plurality of travels of the vehicle;
determining whether any of the plurality of travels include a similar path that corresponds to an identifiable route;
storing information regarding any identified route including information regarding locations along the identified route;
identifying a location along any identified route where driver action corresponded to operating the vehicle in a manner that satisfies a low emission zone operation requirement during the plurality of previous travels along the identified route;
storing the identified location as a location of a low emission zone associated with the identified route;
automatically recognizing the route based on current vehicle movement along at least a portion of a previously identified route; and
determining whether there is any stored identified location of a low emission zone associated with the route.

12. The system of claim 11, wherein
the user interface means includes at least one of a display screen and a speaker; and
the control means includes at least one computing device and memory associated with the at least one computing device.

13. The system of claim 12, wherein the at least one computing device comprises
a first processor configured to determine information regarding the route and the at least one low emission zone; and
a second processor configured to determine the required power capacity.

14. The system of claim 11, wherein the control means is configured for controlling the use of electrical power on the vehicle by automatically selecting an alternative source of power to propel the vehicle along a portion of the route outside the low emission zone to preserve at least the portion of the remaining power for use in the low emission zone.

15. The system of claim 11, wherein the control means is configured for controlling the use of electrical power on the vehicle by controlling the user interface means for providing an indication to a driver to select an alternative source of power to propel the vehicle along a portion of the route outside the low emission zone to preserve at least the portion of the remaining power for use in the low emission zone.

16. The system of claim 11, wherein the control means is configured for determining that there is at least one low emission zone along the route by
determining locations along the route based on navigation information for automatically guiding a driver along the route; and
determining whether any of the locations along the route corresponds to a location of a known low emission zone.

17. The system of claim 11, wherein the control means is configured for determining that there is at least one low emission zone along the route by recognizing at least one feature of a current trip as an indication that the vehicle is on a route that was previously determined to include a low emission zone.

18. The system of claim 11, wherein the control means is configured for determining the required power capacity based on at least one characteristic of the route through the at least one low emission zone, the at least one characteristic having an impact on electrical energy use.

19. The system of claim 18, wherein the at least one characteristic comprises at least one of
   a distance through the low emission zone,
   a change in elevation in the low emission zone,
   a traffic condition in the low emission zone, and
   a weather condition in the low emission zone.

20. The system of claim 11, wherein the control means is configured for
   determining that the remaining power capacity is less than the required power capacity; and
   controlling the user interface means to
   provide an indication corresponding to an alert that there is insufficient power capacity to travel through the low emission zone;
   provide an indication of at least one location where additional power capacity is available prior to reaching the low emission zone; and
   provide automated route guidance to the at least one location based on a user selection of the at least one location.

21. The system of claim 11, wherein the control means is configured for
   identifying at least one vehicle system that uses electrical power; and
   automatically adjusting operation of the at least one vehicle system to reduce an amount of electrical power used by the at least one vehicle system.

22. A vehicle comprising the system of claim 11.

* * * * *